(12) United States Patent
Hsu et al.

(10) Patent No.: US 9,551,985 B2
(45) Date of Patent: Jan. 24, 2017

(54) APPARATUS AND METHOD FOR POSITIONING GEOMETRIC MODEL

(71) Applicant: INDUSTRIAL TECHNOLOGY RESEARCH INSTITUTE, Hsin-Chu (TW)

(72) Inventors: Chih-Yuan Hsu, Kaohsiung (TW); Shuo-Peng Liang, Kaohsiung (TW); Jui-Ming Chang, Taichung (TW); Hsin-Chuan Su, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 717 days.

(21) Appl. No.: 13/845,987

(22) Filed: Mar. 18, 2013

(65) Prior Publication Data

US 2014/0172150 A1 Jun. 19, 2014

(30) Foreign Application Priority Data

Dec. 13, 2012 (TW) .............................. 101147133 A

(51) Int. Cl.
*G06F 19/00* (2011.01)
*G05B 19/4069* (2006.01)

(52) U.S. Cl.
CPC . *G05B 19/4069* (2013.01); *G05B 2219/35314* (2013.01); *G05B 2219/35324* (2013.01)

(58) Field of Classification Search
CPC ................. G05B 19/4069; G05B 2219/35314; G05B 2219/35324
USPC .......................................... 700/186, 190–193
See application file for complete search history.

(56) References Cited

U.S. PATENT DOCUMENTS

| 5,561,601 A | 10/1996 | Inoue et al. |
| 6,290,571 B1 * | 9/2001 | Dilger .............. G05B 19/40937 451/10 |
| 6,662,073 B1 * | 12/2003 | Fujishima .......... G05B 19/4069 700/109 |
| 6,751,523 B2 | 6/2004 | Nakamura |
| 7,251,543 B2 | 7/2007 | Nakamura |

(Continued)

FOREIGN PATENT DOCUMENTS

| CN | 1259692 A | 7/2000 |
| CN | 1461428 | 12/2003 |

(Continued)

OTHER PUBLICATIONS

Office Action of Corresponding Taiwan Application, Jan. 15, 2015.

(Continued)

*Primary Examiner* — Mohammad Ali
*Assistant Examiner* — Ziaul Karim
(74) *Attorney, Agent, or Firm* — Rabin & Berdo, P.C.

(57) ABSTRACT

An apparatus for positioning a geometric model comprises a machine tool, a control unit electrically coupled to the machine tool, a storage unit electrically coupled to the control unit, a positioning module electrically coupled to the storage unit, a virtual target geometry module electrically coupled to the positioning module, and a virtual machine tool module electrically and respectively coupled to the virtual target geometry module and the positioning module. A method for positioning the geometric model includes using components of the apparatus.

20 Claims, 5 Drawing Sheets

(56) References Cited

U.S. PATENT DOCUMENTS

| | | | |
|---|---|---|---|
| 8,175,858 B2 | 5/2012 | Naganawa | |
| 2005/0038624 A1* | 2/2005 | Simakov | G05B 19/4097 702/127 |
| 2008/0199266 A1* | 8/2008 | Katoh | G05B 19/402 408/1 R |
| 2009/0299509 A1 | 12/2009 | Diezel et al. | |
| 2011/0009031 A1* | 1/2011 | Honegger | B23Q 17/2419 451/6 |
| 2011/0257778 A1* | 10/2011 | Takahashi | G05B 19/4069 700/104 |
| 2012/0016514 A1* | 1/2012 | Nakamura | G05B 19/4103 700/188 |

FOREIGN PATENT DOCUMENTS

| | | |
|---|---|---|
| CN | 101145047 | 3/2008 |
| CN | 101342664 | 1/2009 |
| CN | 101546184 | 9/2009 |
| CN | 101654222 A | 2/2010 |
| CN | 101836169 | 9/2010 |
| CN | 101893873 | 11/2010 |
| CN | 102265228 A | 11/2011 |
| CN | 102428419 A | 4/2012 |
| CN | 102449565 | 5/2012 |
| TW | 457411 | 10/2001 |
| TW | I28279 | 11/2007 |
| TW | 200813677 | 3/2008 |
| TW | I336428 | 1/2011 |
| TW | M403716 | 5/2011 |
| TW | I369656 | 8/2012 |

OTHER PUBLICATIONS

Chen, "Smart Machining System", Mechanical Monthly 34-3, pp. 66-72, Mar. 2008.

Lee et al., "Development of Parallel Cutting Simulation with Adaptive Octree Model in Virtual Machine Tool", The 2012 IEEE/ASME International Conference on Advanced Intelligent Mechatronics, pp. 654-658, Jul. 11-14, 2012.

Liang et al., "A software development platform for intelligent shop floor", http://www.automan.tw, vol. 349, 2012.

Hsu et al., "The state of value-added software development of ITRI Controller", http://www.ncl.edu.tw, pp. 24-38, 2010.

Liang et al,. "Development of the Common Human-machine Interface for Multi-axis Machine Tools", The 2012 IEEE/ASME International Conference on Advanced Intelligent Mechatronics Jul. 11-14, 2012.

Wang et al., "The introduction to Turning-Milling Complex Machining Application", Machine tool technology, pp. 29-30, 2009.

China Patent Office, Office Action issued on Feb. 1, 2016.

* cited by examiner

APPARATUS AND METHOD FOR POSITIONING GEOMETRIC MODEL

CROSS REFERENCE TO RELATED APPLICATION

This application also claims priority to Taiwan Patent Application No. 101147133 filed in the Taiwan Patent Office on Dec. 13, 2012, the entire content of which is incorporated herein by reference.

TECHNICAL FIELD

The present disclosure relates to an apparatus and method for automatic positioning geometrical models in machine tools, automation equipments, or other industrial machinery.

BACKGROUND

With rapid advance of the technology of intellectualized machine tools, most modern five-axis machine tools or turn-mill machine tools are equipped and controlled by computers so as to perform multi-tasking machining processes automatically and thus to be competitive in the marketplace. The development and research of intellectualized machine tools are mostly focused upon how to prevent collision between various components of machine tools. Collision avoidance is especially important for high-end multi-axis machine tools. Workpieces to be machined by those high-end multi-axis machine tools are generally high-priced aviation and space parts, vehicle parts, or 3C parts, which are generally designed with many curved surfaces that are difficult to be machined and thus can often suffer heavy damage to workpieces or tools, depending on the intensity of the collision.

For collision avoidance, it is common to perform a pre-operation of machining simulation before any machining process is performed. The difficulty in this pre-operation is to obtain the accurate position of geometric models in the working space of virtual machine tools while workpieces, tools and fixtures usually have different configuration according to the machining process.

There are three methods that are currently available and used for overcoming the aforesaid problem, and one of which is a method of manual measurement. Operationally, the manual measurement method is performed by a worker who actually works to perform a measurement for obtaining the positions of workpieces and fixtures in the working space of a machine tool. The second method is a manual geometrical positioning method that is designed to move or rotate geometric models in a virtual machine tool for defining their relative positions. The last method is a method designed for enabling machining tools, workpieces and fixtures to be placed at their respectively scheduled positions that are stored in advance in machining plans.

However, the first method mentioned above can be very dangerous to the worker as he/she can easily hurt by the machine tool if not careful. The second method is short in its poor accuracy, and the third method is not preferred for its poor flexibility. Therefore, it is in need of a method for accurately detecting the positions of workpieces, tools, fixtures, and components of machine tools and then establishing geometric models in the working space of a virtual machine tool.

SUMMARY

The present disclosure is to provide an apparatus for positioning geometric model, which comprises: a machine tool; a control unit, electrically coupled to the machine tool; a storage unit, electrically coupled to the control unit; a positioning module, electrically coupled to the storage unit; a virtual target geometry module, electrically coupled to the positioning module; and a virtual machine tool module, electrically and respectively coupled to the virtual target geometry module and the positioning module; wherein, the control unit is enabled to control at least one axis of the machine tool to move to a reference pose and probe a geometry while accordingly generating at least one reference pose data and at least one probing data of actual geometry; the storage unit is used for storing the reference pose data and the probing data of actual geometry; the virtual target geometry module is enabled to generate at least one data of virtual target geometry and also is enabled to be selected at least one probing point to be used for generating at least one selected data of positioning of virtual target geometry; the positioning module is enabled to receive the data of virtual target geometry, the selected data of positioning of virtual target geometry, the reference pose data and the probing data of actual geometry to be used for generating a positioning data; and the virtual machine tool module is enabled to receive the positioning data, the data of virtual target geometry and the selected data of positioning of virtual target geometry to be used for generating and positioning a virtual target geometry in the virtual machine tool module.

In an exemplary embodiment, the present disclosure provides a method for positioning geometric model, which comprises the steps of:

using a control unit to control and move at least one axis of a machine tool to a reference pose to generate at least one reference pose data and enabling a reference poses storage module to store the reference pose data;
 enabling at least one axis of the machine tool to probe a geometry to generate at least one probing data of actual geometry and enabling a probing information storage module to store the probing data of actual geometry;
 enabling a virtual target geometry module to generate at least one data of virtual target geometry and also enabling the virtual target geometry module to provide at least one probing point which can be selected to be used for generating at least one selected data of positioning of virtual target geometry;
 enabling a positioning module to generate a positioning data according to the reference pose data, the probing data of actual geometry, the data of virtual target geometry and the selected data of positioning of virtual target geometry; and
 enabling a virtual machine tool module to receive the positioning data, the data of virtual target geometry and the selected data of positioning of virtual target geometry to be used for generating and positioning a virtual target geometry in the virtual machine tool module.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
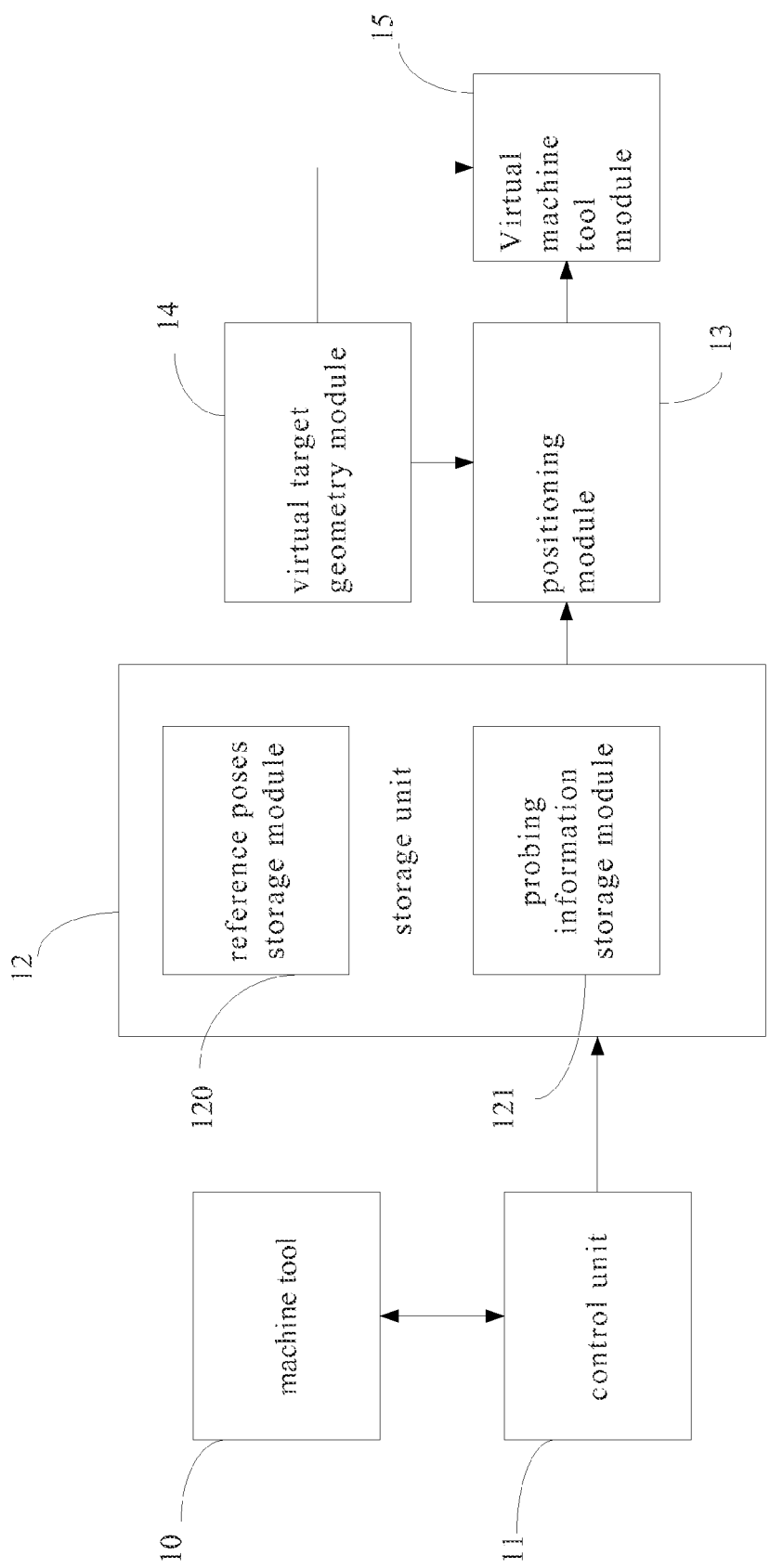
FIG. 1 is a schematic diagram showing an apparatus for positioning geometric models according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a schematic diagram showing an apparatus for positioning geometric models according to an embodiment of the present disclosure. As shown in FIG. 1, the apparatus for positioning geometric models comprises: a machine tool 10, a control unit 11, a storage unit 12, a positioning module 13, a virtual target geometry module 14 and a virtual machine tool module 15.

In an exemplary embodiment, the machine tool 10 can be a computer numerical control (CNC) machine tool; the control unit 11 is electrically coupled to the machine tool 10 for controlling the movement of at least one axis of the machine tool 10; the storage unit 12 is electrically coupled to the control unit 11 and is composed of a reference poses storage module 120 and a probing information storage module 121, in which the reference poses storage module 120 is provided for receiving coordinate information relating to the machine tool 10 that is outputted by the control unit 11 and thus storing a reference pose data, whereas the probing information storage module 121 is also provided for receiving coordinate information relating to the machine tool 10 that is outputted by the control unit 11 and thus storing a probing data of actual geometry; the positioning module 13 is electrically coupled to the storage unit 12 for receiving the reference pose data and the probing data of actual geometry; the virtual target geometry module 14 that is enabled to generate a data of virtual target geometry and a selected data of positioning of virtual target geometry is electrically coupled to the positioning module 13 for enabling the positioning module 13 to receive the data of virtual target geometry, the selected data of positioning of virtual target geometry, the reference pose data and the probing data of actual geometry to be used for generating a positioning data; and the virtual machine tool module 15 is electrically and respectively coupled to the virtual target geometry module 14 and the positioning module 13 and thus is enabled to receive the data of virtual target geometry, the selected data of positioning of virtual target geometry and positioning data to be used for generating and positioning a virtual target geometry in the virtual machine tool module 15.

Figure 2:
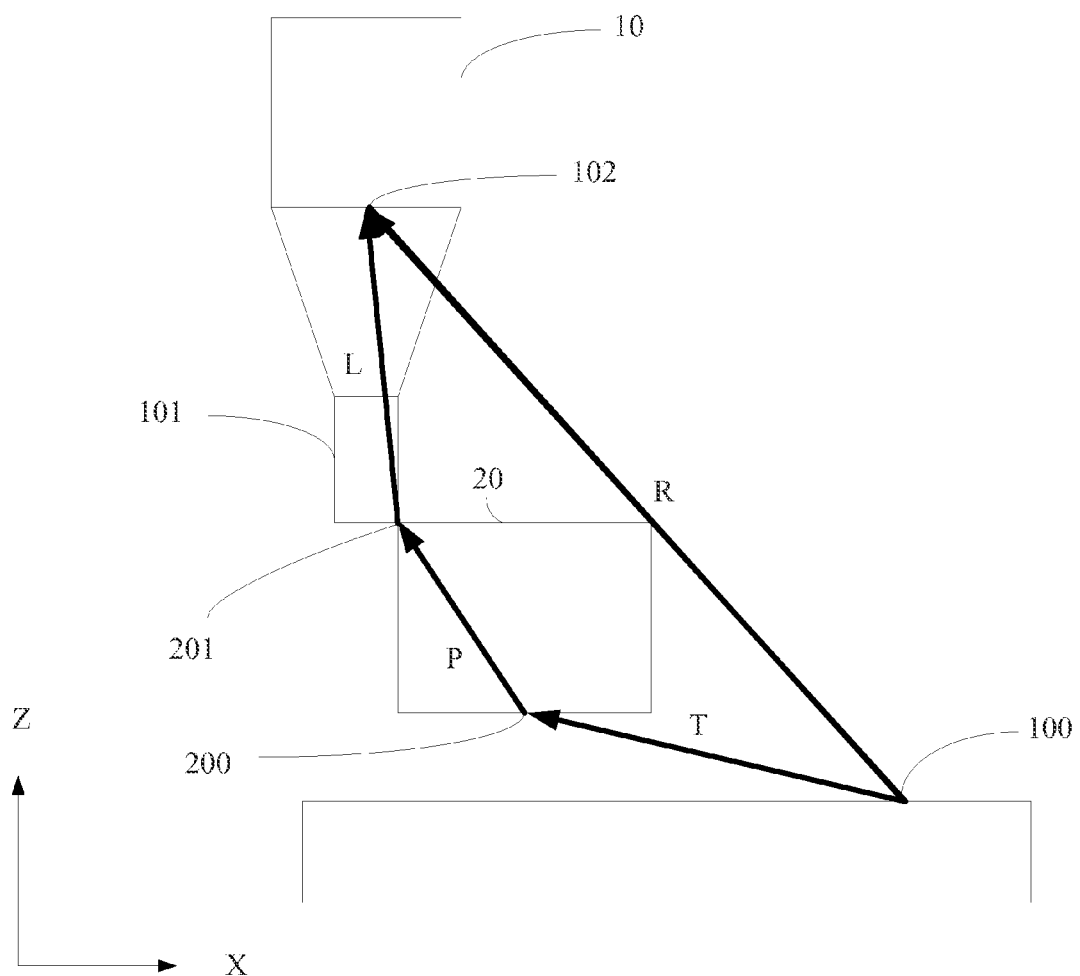
FIG. 2 is a schematic diagram showing a machine tool having a geometric model disposed thereat according to an embodiment of the present disclosure.

Please refer to FIG. 2, which is a schematic diagram showing a machine tool having a geometric model disposed thereat according to an embodiment of the present disclosure. In FIG. 2, there is a geometry 20 being arranged in the machine tool 10, whereas the geometry 20 is featured by an origin of geometry 200 and the machine tool 10 is also featured by an origin of mounting geometry 100.

Operationally, the control unit 11 is enabled to control at least one axis of the machine tool 10 to move to a reference pose while enabling the reference pose to be transmitted to the reference poses storage module 120 for storage. It is noted that there can be at least one reference pose data to be stored in the reference poses storage module 120; and the reference pose data is substantially a coordinate while an origin of mounting entity 102 on at least one axis is coincided with the origin of mounting geometry 100, and the origin of mounting entity 102 is an origin of mounting tool or an origin of mounting measuring tool.

At least one axis of the machine tool 10 uses an entity 101 for probing the geometry 20 at a probing point 201 that is the exact point where the entity 101 is in contact with the geometry 20 so as to generate at least one probing data to be transmitted to and store in the probing information storage module 121. It is noted that there can be at least one probing data of actual geometry being stored in the probing information storage module 121; and the entity 101 can be a tool or a measuring tool.

The positioning module 13 is enabled to receive the reference pose data, the probing data of actual geometry; and the virtual target geometry module 14 is enabled to generate at least one data of virtual target geometry and at least one selected data of positioning of virtual target geometry while enabling the data of virtual target geometry and the selected data of positioning of virtual target geometry to be transmitted to the positioning module 13. Thereafter, the positioning module 13 is able to generate a transformation matrix according to the reference pose data, the probing data of actual geometry, the data of virtual target geometry and the selected data of positioning of virtual target geometry.

For instance, with reference to FIG. 2, the vector T indicates a vector from the origin of mounting geometry 100 to the origin of geometry 200, the vector P indicates a vector from the origin of geometry 200 to the probing point 201; and the vector L indicates a vector from the probing point 201 to the origin of mounting entity 102 that is the position where the machine tool 10 is engaged with and thus holding the entity 101. Moreover, the vector R indicates a vector from the origin of mounting geometry 100 to the origin of mounting entity 102. It is noted that the aforesaid vectors T, P, L and R are used in the aforesaid transformation matrix; whereas the entity 101 can be a tool or a measuring tool, and the origin of mounting entity 102 is an origin of mounting tool or an origin of mounting measuring tool.

In addition, the positioning module 13 is enabled to generate a positioning data by the use of the transformation matrix; and then the virtual machine tool module 15 is enabled to receive the positioning data, the data of virtual target geometry and the selected data of positioning of virtual target geometry to be used for generating and positioning a virtual target geometry in the virtual machine tool module 15.

Figure 3A:
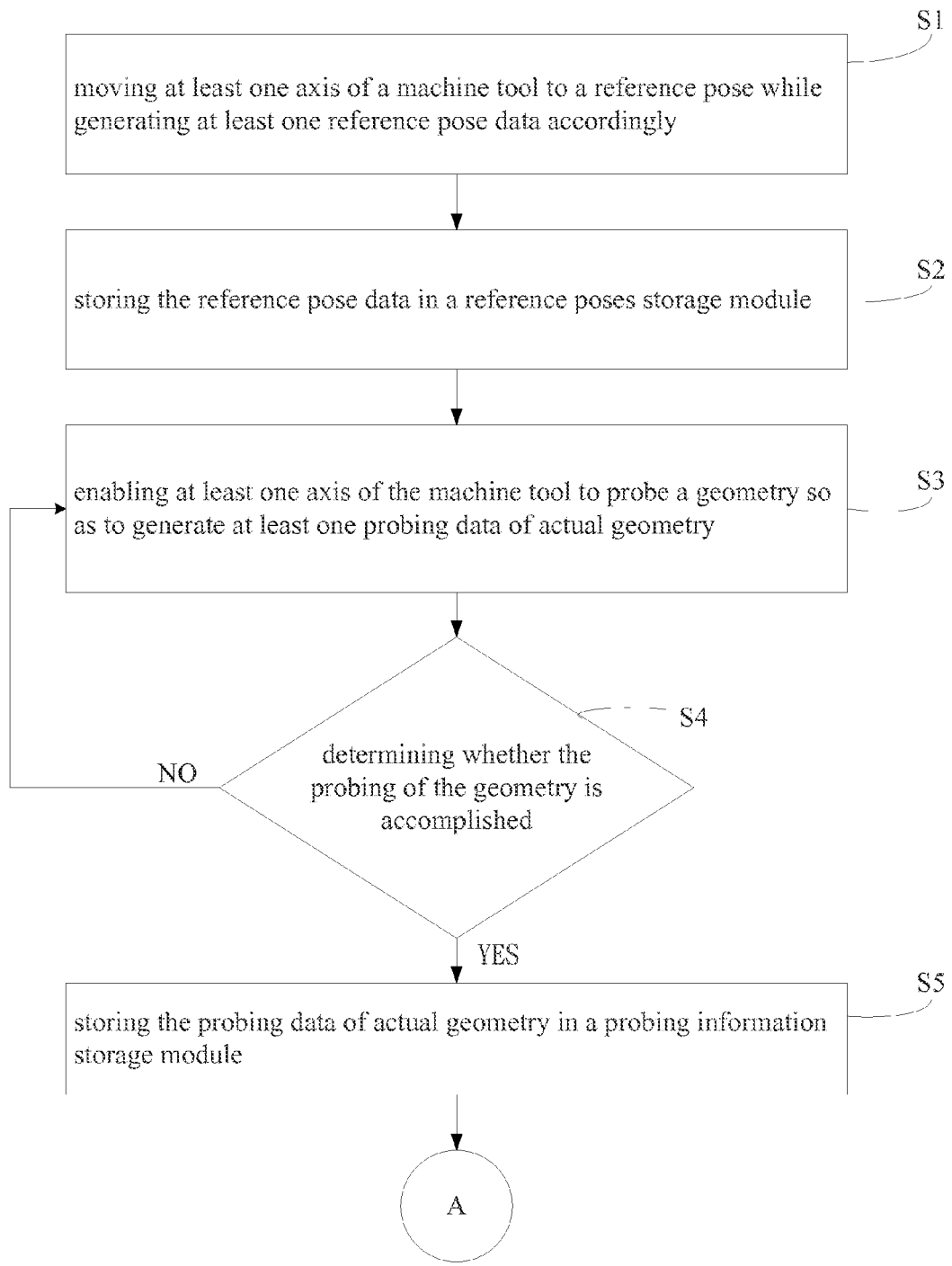
FIG. 3A is a flow chart depicting steps performed in a method for positioning geometric models according to the present disclosure.

Please refer to FIG. 3A, which is a flow chart depicting steps performed in a method for positioning geometric models according to the present disclosure. The method shown in FIG. 3A comprises the following steps:

S1: with reference to FIG. 1 and FIG. 2, the control unit 11 is used for moving at least one axis of the machine tool 10 to a reference pose while generating at least one reference pose data accordingly. In addition, the reference pose data is substantially a coordinate while an origin of mounting entity 102 on at least one axis is coincided with the origin of mounting geometry 100, and the origin of mounting entity 102 is an origin of mounting tool or an origin of mounting measuring tool.

S2: the control unit 11 is enabled to transmit the reference pose data to the reference poses storage module 120 for storage.

S3: At least one axis of the machine tool 10 is enabled to probe the geometry 20 so as to generate a probing data of actual geometry while enabling the probing data of actual geometry to be transmitted to the probing information storage module 121.

S4: an evaluation is made for determining whether the probing is accomplished; and if not, the flow proceeds back to S3, and if so, the flow proceeds to step S5.

S5: the probing data of actual geometry is transmitted to the probing information storage module 121 for storage, and then the flow proceeds to step A.

Figure 3B:
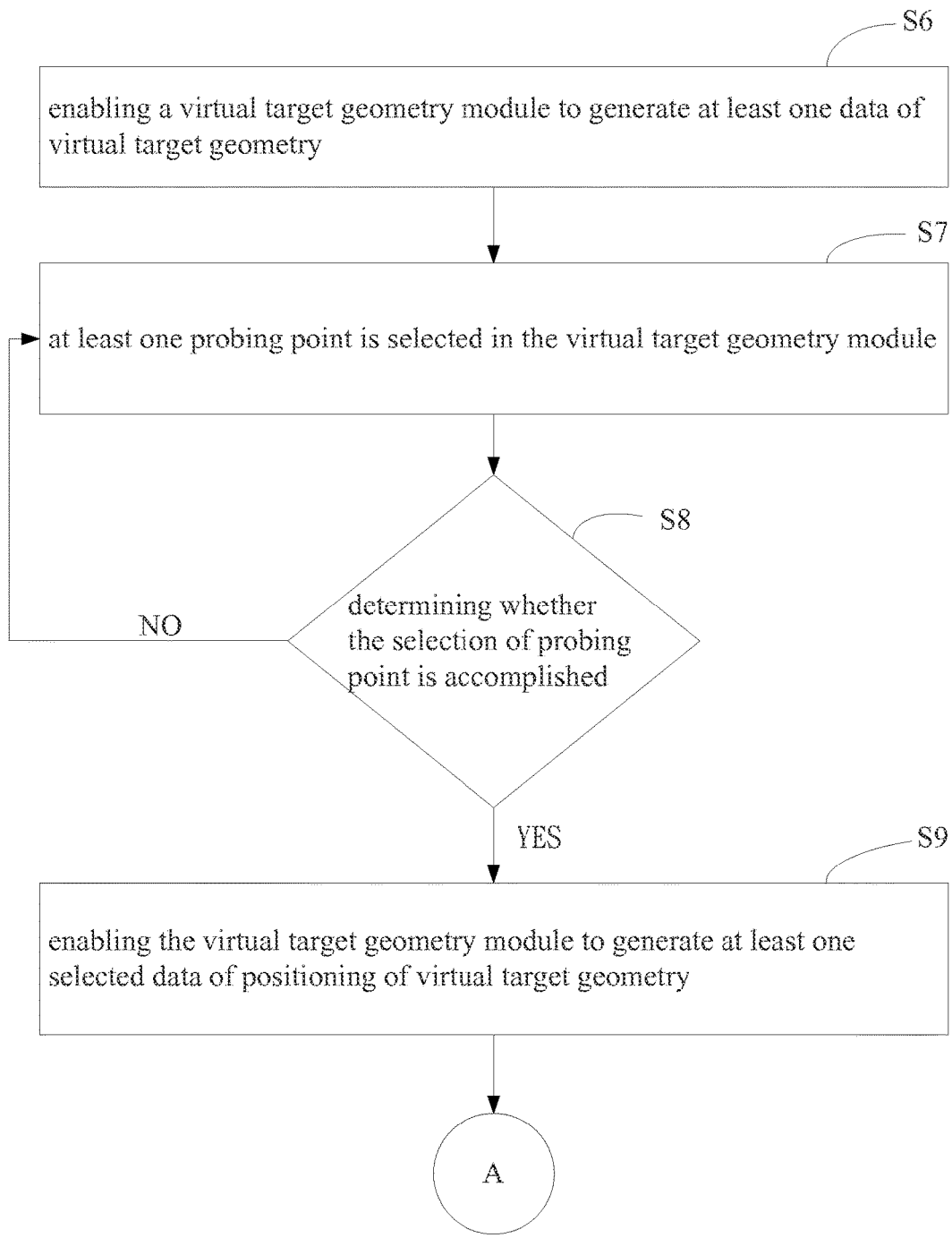
FIG. 3B is a flow chart depicting steps performed in a method for positioning geometric models according to the present disclosure.

Please refer to FIG. 3B, which is a flow chart depicting steps performed in a method for positioning geometric models according to the present disclosure. The method shown in FIG. 3B comprises the following steps:

S6: the virtual target geometry module 14 is enabled to generate at least one data of virtual target geometry.

S7: at least one probing point is selected in the virtual target geometry module 14.

S8: an evaluation is made for determining whether the selection of probing point is accomplished; and if not, the flow proceeds back to step S7, otherwise, the flow proceeds to step S9.

S9: the virtual target geometry module 14 is enabled to generate at least one selected data of positioning of virtual target geometry according to the selected probing point, and then the flow proceeds to step A.

Figure 3C:
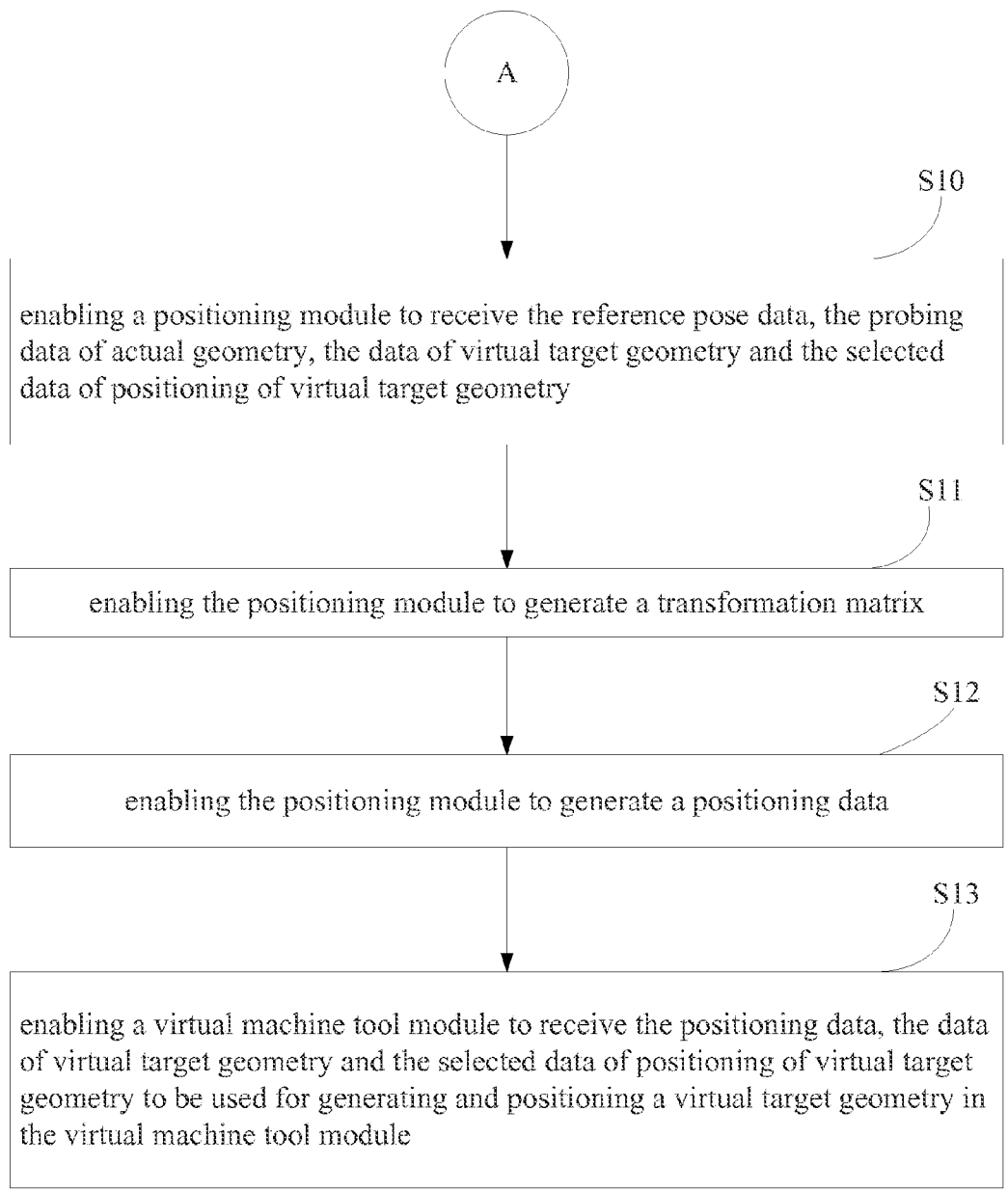
FIG. 3C is a flow chart depicting steps performed in a method for positioning geometric models according to the present disclosure.

Please refer to FIG. 3C, which is a flow chart depicting steps performed in a method for positioning geometric models according to the present disclosure. The method shown in FIG. 3C comprises the following steps:

S10: the storage unit 12 is enabled to transmit the reference pose data and the probing data of actual geometry to the positioning module 13, and the virtual target geometry module 14 is enabled to transmit the data of virtual target geometry and the selected data of positioning of virtual target geometry to the positioning module 13, and thereby, the positioning module 13 is enabled to receive the reference pose data, the probing data of actual geometry, the data of virtual target geometry and the selected data of positioning of virtual target geometry.

S11: the positioning module 13 is enabled to generate a transformation matrix according to the reference pose data, the probing data of actual geometry, the data of virtual target geometry and the selected data of positioning of virtual target geometry.

S12: the positioning module 13 is enabled to use the transformation matrix to generate a positioning data.

S13: the virtual machine tool module 15 is enabled to receive the positioning data, the data of virtual target geometry and the selected data of positioning of virtual target geometry to be used for generating and positioning a virtual target geometry in the virtual machine tool module 15.

To sum up, the apparatus and method of the present disclosure are safe for its operators since the operator is able to detect and probe workpieces and fixtures by the characteristic of the geometry in a machine tool through a control unit. Not to mention that the apparatus and method of the present disclosure are accurate since it is able to generate and position a virtual target geometry in the virtual machine tool module according to the reference pose data, the probing data of actual geometry, the data of virtual target geometry and the selected data of positioning of virtual target geometry. In addition, the apparatus and method of the present disclosure are highly flexible since it can be adapted for positioning geometry, such as workpieces and fixtures in a machine tool, that usually have different configuration according to the machining process.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An apparatus for positioning geometric model, comprising:
    a machine tool;
    a control unit, electrically coupled to the machine tool;
    a storage unit, electrically coupled to the control unit;
    a positioning module, electrically coupled to the storage unit;
    a virtual target geometry module, electrically coupled to the positioning module; and
    a virtual machine tool module, electrically and respectively coupled to the virtual target geometry module and the positioning module;
    wherein, the control unit is enabled to control at least one axis of the machine tool to move to a reference pose and probe a geometry while accordingly generating at least one reference pose data and at least one probing data of actual geometry; the storage unit is used for storing the reference pose data and the probing data of actual geometry; the virtual target geometry module is enabled to generate at least one data of virtual target geometry and at least one selected data of positioning of virtual target geometry; the positioning module is enabled to receive the data of virtual target geometry, the selected data of positioning of virtual target geometry, the reference pose data and the probing data of actual geometry to be used for generating a positioning data; and the virtual machine tool module is enabled to receive the positioning data, the data of virtual target geometry and the selected data of positioning of virtual target geometry to be used for generating and positioning a virtual target geometry in the virtual machine tool module;
    wherein the positioning module is enabled to generate a transformation matrix according to the data of virtual target geometry, the selected data of positioning of virtual target geometry, the reference pose data and the probing data of actual geometry.

2. The apparatus of claim 1, wherein the machine tool is a computer numerical control (CNC) machine tool.

3. The apparatus of claim 1, wherein the reference pose data is a coordinate while an origin of mounting entity on at least one axis is coincided with an origin of mounting geometry, and the origin of mounting entity is an origin of mounting tool or an origin of mounting measuring tool.

4. The apparatus of claim 1, wherein the control unit is used for transmitting the reference pose data to the storage unit.

5. The apparatus of claim 1, wherein the storage unit is further comprised of a reference poses storage module for storing the reference pose data.

6. The apparatus of claim 1, wherein the storage unit is further comprised of a probing information storage module for storing the probing data of actual geometry.

7. The apparatus of claim 1, wherein the virtual target geometry module is enabled to be selected at least one probing point to be used for generating at least one selected data of positioning of virtual target geometry.

8. A method for positioning geometric model, comprising the steps of:
- using a control unit to control and move at least one axis of a machine tool to a reference pose to generate at least one reference pose data and enabling a reference poses storage module to store the reference pose data;
- enabling at least one axis of the machine tool to probe a geometry to generate at least one probing data of actual geometry and enabling a probing information storage module to store the probing data of actual geometry;
- enabling a virtual target geometry module to generate at least one data of virtual target geometry and also enabling the virtual target geometry module to provide at least one probing point which can be selected to be used for generating at least one selected data of positioning of virtual target geometry;
- enabling a positioning module to generate a positioning data according to the reference pose data, the probing data of actual geometry, the data of virtual target geometry and the selected data of positioning of virtual target geometry; and
- enabling a virtual machine tool module to receive the positioning data, the data of virtual target geometry and the selected data of positioning of virtual target geometry to be used for generating and positioning a virtual target geometry in the virtual machine tool module;
- wherein the positioning module is enabled to generate a transformation matrix according to the data of virtual target geometry, the selected data of positioning of virtual target geometry, the reference pose data and the probing data of actual geometry.

9. The method of claim 8, wherein the machine tool is a computer numerical control (CNC) machine tool.

10. The method of claim 8, wherein the control unit is used for moving at least one axis of the machine tool to the reference pose while allowing the control unit to transmit the reference pose data to the reference poses storage module for storage.

11. The method of claim 8, wherein the reference pose data is a coordinate while an origin of mounting entity on at least one axis is coincided with the origin of mounting geometry, and the origin of mounting entity is an origin of mounting tool or an origin of mounting measuring tool.

12. The method of claim 10, wherein the reference poses storage module is used for storing the reference pose data.

13. The method of claim 8, wherein the probing data of actual geometry is transmitted to the probing information storage module for storage.

14. The method of claim 8, further comprising the step of:
- determining whether the probing of the geometry is being proceeded by at least one axis of the machine tool; and if not, enabling the probing to be proceeded.

15. The method of claim 14, further comprising the step of:
- determining whether the probing of the geometry by at least one axis of the machine tool had accomplished; and if so, enabling the probing information storage module to store the probing data of actual geometry.

16. The method of claim 8, further comprising the step of:
- determining whether at least one probing point is selected in the virtual target geometry module; and if not, enabling the selection of the probing point to be proceeded.

17. The method of claim 16, further comprising the step of:
- determining whether the selection of the probing point had been accomplished; and if so, enabling the virtual target geometry module to generate the selected data of positioning of virtual target geometry.

18. The method of claim 8, wherein the data of virtual target geometry, the selected data of positioning of virtual target geometry, the reference pose data and the probing data of actual geometry are transmitted to the positioning module.

19. The method of claim 8, wherein the positioning module is enabled to generate a positioning data by the use of the transformation matrix for positioning a virtual target geometry in the virtual machine tool module.

20. The method of claim 8, wherein the positioning data, the data of virtual target geometry and the selected data of positioning of virtual target geometry are transmitted to the virtual machine tool module.

* * * * *